US008909514B2

(12) United States Patent
Toutanova et al.

(10) Patent No.: US 8,909,514 B2
(45) Date of Patent: Dec. 9, 2014

(54) UNSUPERVISED LEARNING USING GLOBAL FEATURES, INCLUDING FOR LOG-LINEAR MODEL WORD SEGMENTATION

(75) Inventors: Kristina N. Toutanova, Redmond, WA (US); Colin Andrew Cherry, Ottawa (CA); Hoifung Poon, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 921 days.

(21) Appl. No.: 12/637,802

(22) Filed: Dec. 15, 2009

(65) Prior Publication Data

US 2011/0144992 A1 Jun. 16, 2011

(51) Int. Cl.
*G06F 17/27* (2006.01)
*G06F 15/18* (2006.01)
*G10L 15/18* (2013.01)

(52) U.S. Cl.
CPC ..................... *G10L 15/18* (2013.01)
USPC ................................. 704/9; 706/12

(58) Field of Classification Search
CPC ............. G06F 17/2755; G06F 17/277; G06F 17/2863; G06F 17/274; G06F 17/2818; G06F 17/2827; G06F 3/018
USPC ................................. 704/9; 706/12
See application file for complete search history.

(56) References Cited

U.S. PATENT DOCUMENTS 5,268,840 A * 12/1993 Chang et al. .............. 704/9
7,219,035 B2 5/2007 Goodman
7,493,251 B2 * 2/2009 Gao et al. .............. 704/8
2008/0288243 A1 * 11/2008 Kobayashi .............. 704/9
2009/0326916 A1 * 12/2009 Gao et al. .............. 704/4

OTHER PUBLICATIONS

Peng, et al. "Chinese Segmentation and New Word Detection using Conditional Random Fields", Retrieved at <<http://www.aclweb.org/anthology/C/C04/C04-1081.pdf>>, pp. 7.
Nguyen, et al. "Context-Based Arabic Morphological Analysis for Machine Translation", Retrieved at<<http://www.aclweb.org/anthology/W/W08/W08-2118.pdf>>, CoNLL 2008: Proceedings of the 12th Conference on Computational Natural Language Learning, Manchester, Aug. 2008, pp. 135-142.
Sarikaya, et al. "Joint Morphological-Lexical Language Modeling for Processing Morphologically Rich Languages with Application to Dialectal Arabic", Retrieved at<<http://ieeexplore.ieee.org/stamp/stamp.jsp?arnumber=04599398>>, IEEE Transactions on Audio, Speech, and Language Processing, Vol. 16, No. 7, Sep. 2008, pp. 1330-1339.
Pirrelli, et al. "Learning Morphology by Itself", Retrieved at<<http://mmm.lingue.unibo.it/mmm-proc/MMM5/269-290-Pirrelli-Herreros.pdf>>, On-line Proceedings of the Fifth Mediterranean Morphology Meeting (MMM5) Fréjus Sep. 15-18, 2005, University of Bologna, 2007, pp. 269-290.

(Continued)

*Primary Examiner* — Samuel G Neway
(74) *Attorney, Agent, or Firm* — Sandy Swain; Peter Taylor; Micky Minhas

(57) ABSTRACT

Described is a technology for performing unsupervised learning using global features extracted from unlabeled examples. The unsupervised learning process may be used to train a log-linear model, such as for use in morphological segmentation of words. For example, segmentations of the examples are sampled based upon the global features to produce a segmented corpus and log-linear model, which are then iteratively reprocessed to produce a final segmented corpus and a log-linear model.

20 Claims, 4 Drawing Sheets

(56) References Cited

OTHER PUBLICATIONS

Kok, et al. "Extracting Semantic Networks from Text via Relational Clustering", Retrieved at<<http://www.cs.washington.edu/homes/pedrod/papers/ecm108.pdf>>, pp. 16.

Smith Ashton Noah, "Novel Estimation Methods for Unsupervised Discovery of Latent Structure in Natural Language Text", Retrieved at<<http://www.cs.cmu.edu/~nasmith/papers/smith.thesis06.pdf>>, Baltimore, Maryland, Oct. 2006, pp. 1-228.

Chung, et al. "Unsupervised Tokenization for Machine Translation", Retrieved at<<http://www.cs.rochester.edu/~gildea/pubs/chung-gildea-emnlp09.pdf>>, pp. 9.

Andrew Galen, "A Hybrid Markov/Semi-Markov Conditional Random Field for Sequence Segmentation", Retrieved at<<http://research.microsoft.com/pubs/78899/andrew06hybrid.pdf>>, Proceedings of the 2006 Conference on Empirical Methods in Natural Language Processing (EMNLP 2006), pp. 465-472.

Brent, et al. "Discovering Morphemic Suffixes: A Case Study in Minimum Description Length Induction", Retrieved at<<http://citeseerx.ist.psu.edu/viewdoc/download;jsessionid=126B127DEA3E401B83E52D99B1122FDD?doi=10.1.1.50.4836&rep=rep1&type=pdf>>, pp. 1-12.

Creutz, et al. Unsupervised Models for Morpheme Segmentation and Morphology Learning <<http://delivery.acm.org/10.1145/1220000/1217101/p1-creutz.pdf?key1=1217101&key2=7097549421&coll=GUIDE&dl=GUIDE&CFID=47634569&CFTOKEN=36737098>>, ACM Transactions on Speech and Language Processing, vol. 4, No. 1, Article 3, Jan. 2007, pp. 1-34.

Dasgupta, et al. "High-Performance, Language-Independent Morphological Segmentation", Retrieved at<<http://acl.ldc.upenn.edu/N/N07/N07-1020.pdf>>, Proceedings of NAACL HLT 2007 Rochester, NY, Apr. 2007, pp. 155-163.

Demberg Vera, "A Language-Independent Unsupervised Model for Morphological Segmentation", Retrieved at<<http://acl.ldc.upenn.edu/P/P07/P07-1116.pdf>>, Proceedings of the 45th Annual Meeting of the Association of Computational Linguistics, Prague, Czech Republic, Jun. 2007, pp. 920-927.

Goldsmith John, Unsupervised Learning of the Morphology of a Natural Language <<http://acl.ldc.upenn.edu/J/J01/J01-2001.pdf>>, 2001, pp. 46.

Goldwater, et al. Interpolating Between Types and Tokens by Estimating Power-Law Generators <<http://cocosci.berkeley.edu/tom/papers/typetoken.pdf>>, pp. 8.

Goldwater, et al. "Distributional Cues to Word Segmentation: Context is Important", Retrieved at<<http://cocosci.berkeley.edu/tom/papers/context.pdf>>, pp. 12.

Habash, et al. "Arabic Tokenization, Part-of-Speech Tagging and Morphological Disambiguation in One Fell Swoop", Retrieved at<<http://delivery.acm.org/10.1145/1220000/1219911/p573-habash.pdf?key1=1219911&key2=9388549421&coll=GUIDE&dl=GUIDE&CFID=47636101&CFTOKEN=25605099>>, Proceedings of the 43rd Annual Meeting of the ACL, Jun. 2005, pp. 573-580.

Harris Zellig S. "From Phoneme to Morpheme", Retrieved at<<http://www.jstor.org/pss/411036>>, JSTOR: Language, vol. 31, No. 2 (Apr.-Jun., 1955), p. 1.

Keshava, et al. "A Simple, Intuitive Approach to Morpheme Induction", Retrieved at<<http://www.cis.hut.fi/morphochallenge2005/P05_KeshavaPitler.pdf>>, pp. 5.

Klein, et al. "Natural Language Grammar Induction using a Constituent-Context Model", Retrieved at <<http://www.cs.berkeley.edu/~klein/papers/klein_and_manning-constituent_context_model-NIPS_2001.pdf>>, pp. 8.

Kurimo, et al. "Overview of Morpho Challenge in CLEF 2007", Retrieved at<<http://www.cis.hut.fi/mikkok/kurimoCLEF2007.pdf>>, pp. 8.

Poon, et al. "Joint Unsupervised Coreference Resolution with Markov Logic", Retrieved at<<http://www.cs.washington.edu/homes/pedro/papers/emnlp08.pdf>>, pp. 10.

Rosenfeld R., "A Whole Sentence Maximum Entropy Language Model", Retrieved at<<http://citeseerxist.psu.edu/viewdoc/download?doi=10.1.1.40.4834&rep=rep1&type=pdf>>, pp. 8.

Sarawagi, et al. "Semi-Markov Conditional Random Fields for Information Extraction ", Retrieved at<<http://www.cs.cmu.edu/~wcohen/postscript/semiCRF.pdf>>, pp. 8.

Schone, et al. "Knowledge-Free Induction of Inflectional Morphologies", Retrieved at<<http://www.stanford.edu/~jurafsky/NAACL2001_Morphology_final.pdf>>, pp. 9.

Smith, et al. "Contrastive Estimation: Training Log-Linear Models on Unlabeled Data", Retrieved at <<http://www.cs.cmu.edu/~nasmith/papers/smith+eisner.acl05.pdf>>, pp. 9.

Snyder, et al. "Cross-Lingual Propagation for Morphological Analysis", Retrieved at <<http://people.csail.mit.edu/bsnyder/papers/aaai08-bsnyder.pdf>>, 2008, pp. 7.

Snyder et al. "Unsupervised Multilingual Learning for Morphological Segmentation", Retrieved at<<http://people.csail.mit.edu/bsnyder/papers/SnyderB-acl08.pdf>>, pp. 9.

* cited by examiner

UNSUPERVISED LEARNING USING GLOBAL FEATURES, INCLUDING FOR LOG-LINEAR MODEL WORD SEGMENTATION

BACKGROUND

Morphological units are the smallest units of meaning in a language. A general goal of morphological segmentation is to segment words into morphemes, the basic syntactic/semantic units. For example, the English word "governments" may be properly segmented into govern-ment-s. Such segmentations are useful in helping natural language processing technologies, including in machine translation, speech recognition, question answering and web search.

Dictionaries exist for these segmentations for common words in some languages. However, they do not exist for new vocabulary words and some languages.

Past morphological segmentation approaches include rule-based morphological analyzers and supervised learning. While generally successful, these require deep language expertise and a relatively long, costly and labor-intensive process in system building or labeling.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which unlabeled examples are processed into global features in an unsupervised learning process. The unsupervised learning process may be used to train a log-linear model, such as for use in morphological segmentation of words.

In one implementation, segmentations of the examples are sampled based upon the global features to produce an interim segmented corpus and an interim log-linear model. Negative examples, e.g., comprising characters transposed from within actual words, may be used in the processing. By iterating to repeatedly revise and improve the interim log-linear model and interim segmented corpus, a final segmented corpus and a log-linear model are obtained, such as for use in morphological segmentation.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards unsupervised learning of a model via global features extracted from a set of data, such as a corpus of words processed to obtain a morphological segmentation of those words. In one aspect, the model may be a log-linear model/algorithm, which, as described below, may define the joint probability distribution for a corpus (i.e., the words) and a segmentation on the corpus. This provides segmented data for the corpus, along with a model by which new words not in the corpus may be segmented.

In general, the log-linear aspect allows the model to use flexible feature representations without concern for conditional independence. Unsupervised means the model can learn to process data (e.g., segment words) by seeing only that data, without ever seeing an example output (e.g., segmentation). Global features allow considering the output (e.g., segmentation) of the entire set of data jointly; for example, segmentation decisions are not independent between words.

It should be understood that any of the examples herein are non-limiting. For example, words in a corpus and morphological segmentation are only one way global features may be used in unsupervised learning to learn a model, such as a log-linear model. Other examples include other types of information such as image data. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and unsupervised learning in general.

Figure 1:
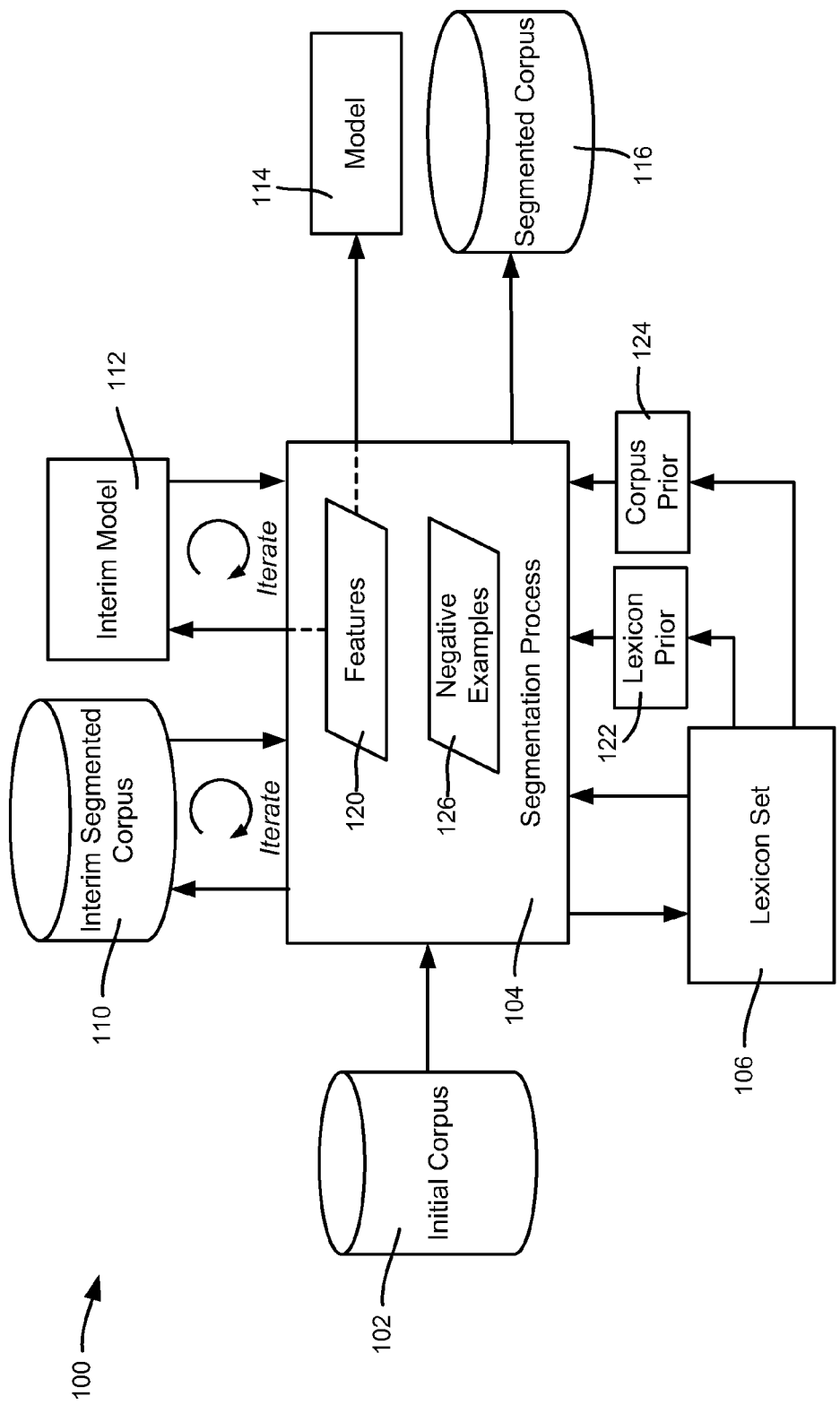
FIG. 1 is a block diagram representing example components of a system for processing a corpus into a model and a segmented corpus.

FIG. 1 is a block diagram representing example components of an example morphological segmentation system 100. An initial corpus 102 comprising a list of words to be segmented (e.g., of a particular language) is processed by a segmentation process 104 that samples a segmentation, e.g., for the entire corpus 102. Note that for one application, words are not repeated in the corpus, e.g., there is only one instance of each word in the corpus, like in a conventional dictionary. For learning, the corpus may be viewed as a collection of word types (unique words) or tokens (word occurrences), although using word types tends to lead to improved performance. Types may be used in learning and inference, described below, with the constraint that words can have only one segmentation per type.

In general, the segmentation process 104 proposes segments for random words, and tracks them in a lexicon set 106 (in one implementation this set comprises a plurality of lexicons, one for prefixes one for stems and one for suffixes). More particularly, note that a word often may be decomposed into a stem and some prefixes and suffixes. This is particularly true for languages with predominantly inflectional morphology, such as Arabic, Hebrew, and English. Thus, one implementation of the model uses separate lexicons for prefixes, stems, and suffixes. This results in a small but non-negligible accuracy gain as measured in experiments. Note that in one implementation, a stem needs to contain at least two characters and have no fewer characters than any affixes in the same word. In a segmentation where several morphemes have a maximum length, any of them can be identified as the stem, each resulting in a distinct segmentation.

When the words in the initial corpus 102 have been processed, the result is an interim corpus 110 and interim model 112 that are iteratively revised in conjunction with the lexicon set 106 until a final model 114 and segmented corpus 116 are obtained. In other words, segmentation implies a model which in turn biases the system 100 towards a new segmentation based on what the system 100 has previously observed; each iteration then moves the system 100 closer to a final segmentation and model By way of example, consider FIG. 2, which shows a very small corpus 202 containing five words, namely ['remove' 'move' 'moved' 'live' 'lived'] as examples. Initially, these words are added to the lexicon set as morphemes, such as initially comprising the entire word; then possible segmentations for the word are considered. Morphemes are stored as individual instances within their respective (e.g., prefix, stem or suffix) dictionary; in other words, each lexicon contains the unique morphemes identified by a complete segmentation of the corpus. During the iterations, the morphemes and contexts are assigned weights (alternatively referred to as scores) generally based on how often they are observed. Given a large enough corpus, regular patterns will be present thereby increasing the weights of certain morphemes and contexts, whereby in the example of FIG. 2, the segmented corpus 216 ultimately contains the segmentations ['re-move' 'move' 'move-d' 'live' 'live-d'] for these words.

Contexts are also part of the features 120, wherein contexts are represented using n-grams before and after the respective morpheme, for some constant n. In general, contexts are used to accumulate weights for possible ways in which morphemes are used, (e.g., to reflect that it is acceptable to put a segment 'move' in between a 're' and a 'd' character). Note that unigrams may be used for context features, however bigrams and trigrams tend to lead to higher accuracy, and in one full model implementation, trigrams are used.

By way of example, consider the segmented Arabic corpus shown below along with its features, in which the example tracks bigram contexts of n=2. The segmentation is indicated with hyphens, while the hash symbol (#) represents the word boundary:

| Segmented Corpus | | | | |
|---|---|---|---|---|
| hnAk | w-vlAv-wn | bn-w | Al-ywm | Al-jmAEp |
| Morpheme Feature:Value | | | | | | | | |
| hnAk:1 | w:2 | vlAv:1 | wn:1 | bn:1 | Al:2 | ywm:1 | jmAEp:1 | hnAk:1 |
| wvlAvwn:1 | bnw:1 | Alywm:1 | AljmAEp:1 | | | | | |
| Bigram Context Feature:Value | | | | | | |
| ##_vl:1 | #w_wn:1 | Av_##:1 | ##_w#:1 | bn_##:1 | ##_yw:1 | Al_##:2 |
| ##_jm:1 | ##_##:5 | | | | | |

Figure 3:
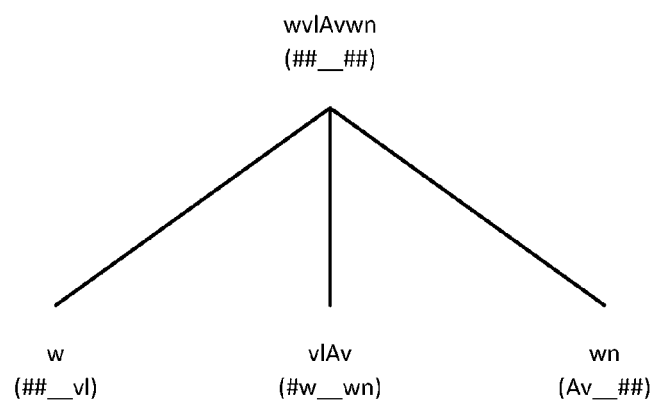
FIG. 3 is an example of the morpheme and context features for a segmented word.

The corresponding morpheme and context (in parentheses) features for the segmented word w-vlAv-wn are shown in FIG. 3, in which the morphological segmentation of a word is viewed as a flat tree, in which the root node corresponds to the word and the leaves correspond to morphemes. The context features corresponding to each morpheme are also shown. Each morpheme and context feature (represented as part of the block 120 in FIG. 1) is associated with a weight, which correlates with the likelihood that the corresponding morpheme or context marks a valid morphological segment based upon previous observations. As can be readily appreciated, such overlapping features allow capturing rich segmentation regularities.

By way of example, given the Arabic word Alywm, to derive its correct segmentation Al-ywm, it helps to know that Al and ywm are likely morphemes, whereas Aly or lyw are not; (note that the word as a whole is also treated as a morpheme in itself). It also helps to know that Al_## or ##_yw are likely morpheme contexts whereas, ly_## or ##_wm are not. Iteratively processing the corpus finds such segmentation regularities based upon the words in the corpus.

In a given word, when a morpheme is identified as the stem, any preceding morpheme is identified as a prefix, whereas any following morpheme as a suffix. The sample segmented corpus described above may provide the following lexicon set:

| Prefix | | | | |
|---|---|---|---|---|
| w | Al | | | |
| Stem | | | | |
| hnAk | vlAv | bn | ywm | jmAEp |
| Suffix | | | | |
| wn | w | | | |

In one implementation, a log-linear model defines the joint probability distribution for a corpus (e.g., containing the words) and a segmentation on the corpus. The model includes a morpheme-context model, with one feature for each morpheme, and one feature for each morpheme context. Note that unlike other known unsupervised learning techniques, global features are used in learning the model. The global features indicate the size of each lexicon (e.g., the length is the total number of characters in that lexicon).

In general, unsupervised learning with log-linear models is based upon computing a normalization constant (also known as the partition function) Z. In unsupervised learning, where there are no supervised labels, contrastive estimation is a technique that uses a small neighborhood to compute Z. The neighborhood is designed so that it not only makes computation easier but also offers sufficient contrastive information (e.g., negative examples 126) to aid in the unsupervised learning. At the same time, sampling may be used to approximate Z. As described herein, the system uses contrastive estimation to create a manageable, informative Z, and also uses sampling to enable the use of global features in learning the log-linear model.

In addition to the features of the morpheme-context model, two priors are incorporated into the system based upon general intuitions about morphological segmentations. First, the number of distinct morphemes used to segment a corpus should be relatively small, which is achieved when the same morphemes are reused across many different words. The model incorporates this intuition by imposing a lexicon prior 122 (FIG. 1) comprising an exponential prior with negative weight on the length of the morpheme lexicon. In this way, a lexicon contains few unique morphemes, and those morphemes are short.

However, the lexicon prior 122 alone incorrectly favors a trivial segmentation that divides each word into individual characters, which results in the smallest lexicon possible, namely single characters. To avoid this, a corpus prior 124 is imposed, comprising an exponential prior on the number of morphemes used to segment each word in the corpus, which penalizes over-segmentation. Note that longer words tend to have more morphemes. Therefore, each word's contribution to the corpus prior 124 is normalized by the word's length in characters. For example, the segmented word w-vlAv-wn contributes 3/7 (three segments divided by seven characters) to the total corpus size. It is straightforward to incorporate such a prior in a log-linear model, in contrast to a directed generative model.

The use of the two priors 122 and 124 is related to the minimum description length (MDL) length principle; the lexicon prior 122 favors fewer morpheme types, whereas the corpus prior 124 favors fewer morpheme tokens. They provide the model with an initial inductive bias.

The following describes some notation used in a formal model described below. Let W be a corpus (i.e., a set of words), and S be a segmentation that breaks each word in W into prefixes, a stem, and suffixes. Let σ be a string (character sequence). Each occurrence of σ will be in the form of $\Psi_1 \sigma \Psi_2$, where $\Psi_1$, $\Psi_2$ are the adjacent character n-grams, and c=$(\Psi_1, \Psi_2)$ is the context of σ in this occurrence. Thus, a segmentation can be viewed as a set of morpheme strings and their contexts. For a string x, L(x) denotes the number of characters in x; for a word w, $M_s(w)$ denotes the number of morphemes in w given the segmentation S; Pref(W, S), Stem (W, S), Suff(W, S) denote the lexicons of prefixes, stems, and suffixes induced by S for W. Then, one model defines a joint probability distribution over a restricted set of W and S:

$$P_\theta(W, S) = \frac{1}{Z} \cdot u_\theta(W, S)$$

where $$u_\theta(W, S) = \exp\left(\sum_\sigma \lambda_\sigma f_\sigma(S) + \sum_c \lambda_c f_c(S) + \alpha \cdot \sum_{\sigma \in Pref(W,S)} L(\sigma) + \alpha \cdot \sum_{\sigma \in Stem(W,S)} L(\sigma) + \alpha \cdot \sum_{\sigma \in Suff(W,S)} L(\sigma) + \beta \cdot \sum_{w \in W} M_S(w)/L(w)\right)$$

Here, $f_\sigma(S)$ and $f_c(S)$ are, respectively, the occurrence counts of morphemes and contexts under S, and $\theta=(\lambda_\sigma, \lambda_c: \sigma, c)$ are their feature weights. The weights for the priors are α for the lexicon prior, and β for the corpus prior. Z is the normalization constant, which sums over a set of corpora and segmentations.

Learning with probabilistic models can be viewed as moving probability mass to the observed data. For log-linear models, the mass is taken from the set that Z sums over. Contrastive estimation may be used, with the set defined to be a neighborhood of the observed data, where for words the neighborhood is possibly the set of other words/character combinations that can be made with those characters. The instances in the neighborhood can be viewed as pseudo-negative examples, and learning seeks to discriminate them from the observed instances.

It is known that for words, good neighborhoods are provided by TRANS1 (transposing any pair of adjacent words) and DELORTRANS1 (deleting any word or transposing any pair of adjacent words). For morphological segmentation, instead of transposing words, characters may be transposed. However, because in morphology, deleting a character from one word (e.g., "host") often results in another legitimate word (e.g., "hot"), the model described herein uses TRANS1. This works well because transposing a pair of adjacent characters usually results in a non-word, e.g., swapping the 'e' and the 'm' in remove provide 'rmeove' which is not a valid word and thus a good negative example. To combat overfitting in learning, a Gaussian prior ($L_2$ regularization) may be imposed on the weights.

Let W* be the observed corpus, and let N(.) be a function that maps a string to a set of strings; let N(W*) denote the set of all corpora that can be derived from W* by replacing every w ∈W* with one in N(w). Then, $$Z = \sum_{W \in N(W^*)} \sum_S u(W, S).$$

Unsupervised learning maximizes the log-likelihood of observing W*:

$$L_\theta(W^*) = \log \sum_S P(W^*, S)$$

Gradient descent may be used for this optimization; the partial derivatives for feature weights are:

$$\frac{\partial}{\partial \lambda_i} L_\theta(W^*) = E_{S|W^*}[f_i] - E_{S,W}[f_i]$$

where i is a string σ or a context c. The first expected count ranges over all possible segmentations while the words are fixed to those observed in W*. For the second expected count, the words also range over the neighborhood. In this manner, the model is adjusted such that actual words become more likely than negative examples.

As described above, the lexicon prior renders all objects (words) interdependent in terms of segmentation decisions. Consider the simple corpus with just two words: Alrb, lAlrb. If lAlrb is segmented into l-Al-rb, Alrb can be segmented into Al-rb without paying the penalty imposed by the lexicon prior. If, however, lAlrb remains a single morpheme, and Alrb is still segmented into Al-rb, then two new morphemes are introduced into the lexicon set, which is penalized by the lexicon prior accordingly. As a result, the whole corpus needs to be segmented jointly, making exact inference intractable, whereby approximate inference is instead used. In one implementation, to compute $E_{S|W^*}[f_i]$, Gibbs sampling is used.

To derive a sample, the procedure goes through each word and samples the next segmentation conditioned on the segmentation of all other words. With m samples S1, ..., $S_m$, the expected count may be approximated as:

$$E_{S|W^*}[f_i] \approx \frac{1}{m} \sum_j f_i(S_j)$$

There are $2^{n-1}$ ways to segment a word of n characters (e.g., 'lived' 'live-d' 'l-ive-d' and so on). To sample a new segmentation for a particular word, a conditional probability is computed for each of these segmentations, which may be done by explicit enumeration, as well as other ways (e.g., implicit enumeration). When n is large, this computation is relatively expensive. However, the maximum number of morphemes that a word contains is usually a small constant in many languages. Therefore, a constraint may be imposed such that a word may be segmented into no more than k morphemes, where k is a language-specific constant, e.g., determined from prior knowledge or via a development set. This constraint substantially reduces the number of segmentation candidates to consider; for example, with k=5, it reduces the number of segmentations to consider by almost ninety percent for a word of 14 characters. $E_{S,W}[f_i]$ can be computed by Gibbs sampling in the same way, except that in each step the next word is also sampled from the neighborhood, in addition to the next segmentation.

Figure 2:
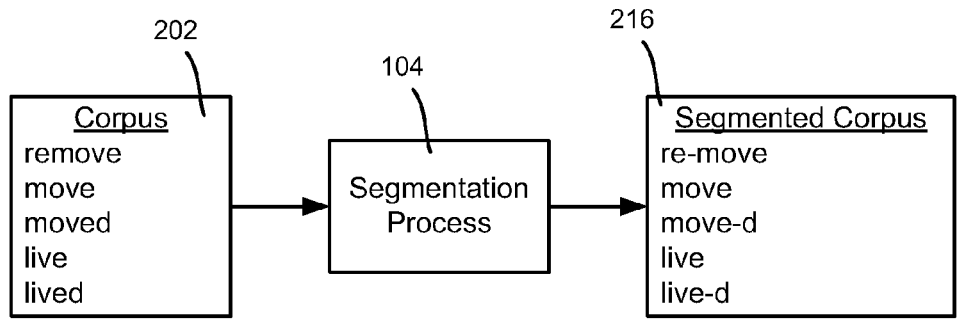
FIG. 2 is an example of how a simplified corpus may be segmented into a segmented corpus.

By way of example, consider FIG. 2 in which the word 'lived' was not seen before and is being processed, and thus may be added to the lexicon. At this time, assume a simple lexicon of ['rem' 'ove' 'm' 'd' 'live']. Adding it as a whole (one segment) to the lexicon will increase its size by five characters, thus adding 5α and 1/5β. In this example, the morpheme has no associated morpheme feature weight yet, but has a context feature weight, e.g., equal to 5. Another candidate segmentation is 'live-d' which already has segments in the lexicon, whereby only 2/5β will be added. As can be seen, the features are being extracted for each candidate segmentation, and the weights may be compared. Negative samples from the neighborhood may be similarly processed.

However, instead of choosing the most likely segmentation, sampling is used to probabilistically select a candidate based upon the weights. Thus, the most likely segmentation will be selected more often than the next most likely segmentation, and so on, but it is still possible to choose any candidate.

Further, when computing the most probable segmentation, deterministic annealing may be used, which works like known sampling algorithms except that the weights are divided by a temperature that starts with a large value and gradually drops to a value close to zero, e.g., so that the weights become more of a factor in the probability as the model becomes more trusted. When computing the expected counts, the sampler may be initialized with the most probable segmentation output by annealing.

Note that while unsupervised learning is described, the learning algorithm also can be readily applied to supervised or semi-supervised learning. For example, if a correct ("gold") segmentation is available for some words, denoted as S* semi-supervised learning is being done; if S* contains gold segmentations for all words in a set W, supervised learning is being done. Training maximizes $L_\theta(W^*, S^*)$; the partial derivatives become:

$$\frac{\partial}{\partial \lambda_i} L_\theta(W^*, S^*) = E_{S|W^*, S^*}[f_i] - E_{S,W}[f_i]$$

One difference in comparison with unsupervised learning is that the known segmentation is fixed when computing the first expected counts. When labels are available, one model learns more effectively than a directed graphical model.

Figure 4:
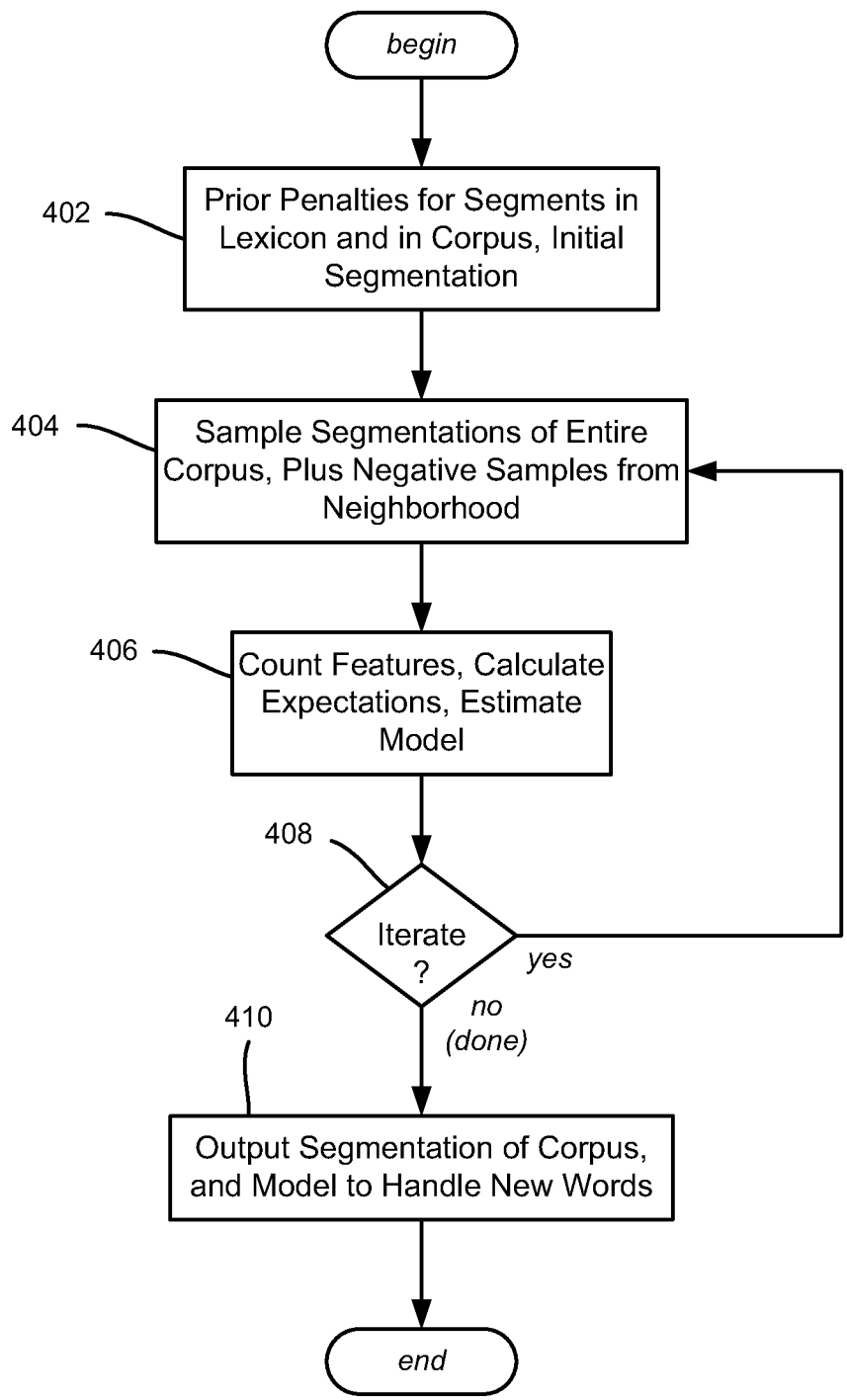
FIG. 4 is a flow diagram showing example steps that may be taken to process a corpus into a model and a segmented corpus.

FIG. 4 is a flow diagram showing example steps in the learning process, starting with a word list (the corpus) and user-provided parameters, as generally represented by step 402. For example, in one implementation, the weights for the lexicon and corpus priors were set to α=−1 and β=−20, respectively; the feature weights were initialized to zero and were penalized by a Gaussian prior with $\sigma^2=100$. In this implementation, thirty iterations were used for learning, and in each iteration, 200 samples were collected to compute each of the two expected counts. The sampler was initialized by running annealing for 2,000 samples, with the temperature dropping from 10 to 0.1 at 0.1 decrements. The most probable segmentation was obtained by running annealing for 10,000 samples, using the same temperature schedule.

Step 404 represents the sampling operation described above, e.g., for the entire corpus using the existing lexicon set and the negative samples (to provide a random negative word), as described above. Step 406 represents estimating the model based on the features and calculated expectations for positive and negative examples. For example, if there are 100 samples taken, the features may be counted, divided by 100 to provide an expectation of how often a feature is expected to be seen.

Step 408 iterates steps 404 and 406 until some stopping criterion is met, e.g., a fixed number of iterations, or some evaluation of the previous state versus the current state that indicates no significant change in the segmented data/model.

Step 410 represents completing the learning. When the iterations are complete, the segmented corpus may be output for use in segmenting existing words, as well as the model for segmenting new, previously unseen words.

Exemplary Operating Environment

Figure 5:
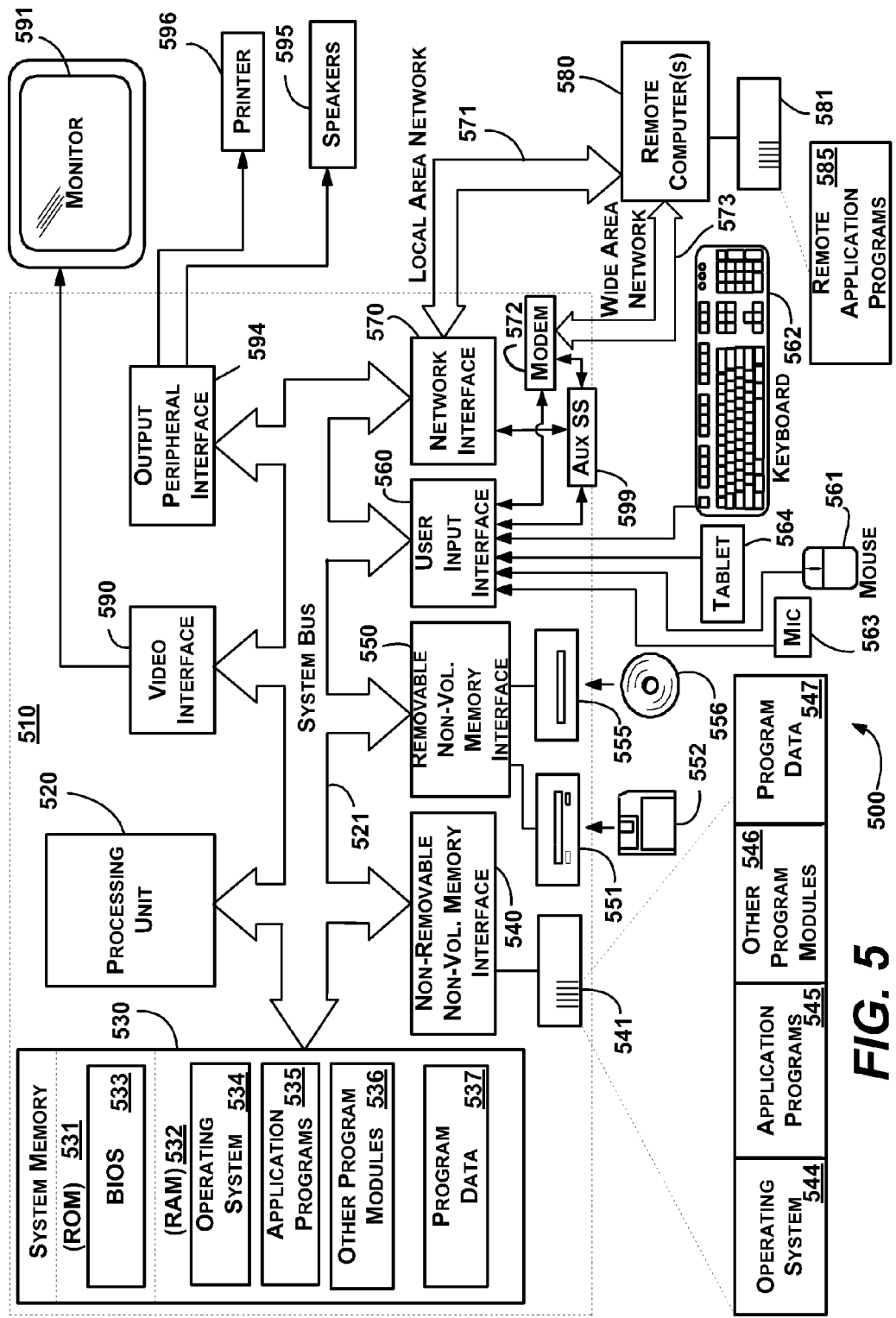
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures.

By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor, comprising:
using at least one processor to perform unsupervised learning on examples in training data, including processing the examples to extract global features, in which the global features are based on a plurality of the examples, and learning a model from the global features including using at least two priors to provide an initial inductive bias to the model, further including imposing one exponential prior to penalize segmentation of words into longer segments and another exponential prior to penalize over-segmentation.

2. The method of claim 1 wherein processing the examples comprises processing language data.

3. The method of claim 2 wherein the global features include lexicon length features for one or more lexicons of morphemes, wherein other features include morpheme features and context features extracted from words, with overlapping context and morpheme values, and wherein processing the language data comprises obtaining a morphological segmentation of the words.

4. The method of claim 2 wherein processing the language data comprises determining a neighborhood corresponding to an example, including at least one negative example.

5. The method of claim 3 wherein processing the language data comprises incorporating the at least two priors into the system based upon intuition data about morphological segmentations.

6. The method of claim 2 wherein processing the language data comprises providing a morphological segmentation of words in the language data.

7. The method of claim 3 wherein processing the language data comprises sampling based on a neighborhood corresponding to each example.

8. The method of claim 7 further comprising, using deterministic annealing in the sampling.

9. The method of claim 1 wherein learning the model comprises learning a log-linear model, and further comprising, outputting the log-linear model.

10. In a computing environment, a method performed on at least one processor: (a) processing unlabeled examples of words into an interim segmented corpus and an interim log-linear model; (b) using the at least one processor and the interim log-linear model to reprocess the interim segmented corpus into a revised segmented corpus and a revised log-linear model; (c) iterating until a stop criterion is met by returning to step (b) with the revised segmented corpus being used as the interim corpus and the revised log-linear model being used as the interim model; and (d) when the stop criterion is met, outputting the log-linear model for use in morphological segmentation.

11. The method of claim 10 wherein processing the unlabeled examples of words comprises maintaining a lexicon set of morphemes, and weight information for morpheme and context features, where contexts describe characters adjacent a particular morpheme.

12. The method of claim 11 wherein maintaining the lexicon set comprises maintaining a lexicon for prefixes, maintaining a lexicon for stems and maintaining a lexicon for suffixes.

13. The method of claim 10 wherein processing the unlabeled examples of words comprises computing overlapping context and morpheme features.

14. The method of claim 13 further comprising, using the overlapping context and morpheme features and their weights to sample a neighborhood for an example.

15. The method of claim 14 further comprising, sampling at least one negative example for contrastive estimation.

16. One or more computer-readable storage media having computer-executable instructions, which when executed perform steps, comprising:
(a) processing unlabeled examples of words into global features, in which the global features are based on a plurality of the examples;
(b) sampling segmentations of the examples to produce an interim segmented corpus and an interim log-linear model that uses the global features;
(c) using the interim log-linear model to reprocess the interim segmented corpus into a revised segmented corpus and a revised log-linear model;
(d) iterating by returning to step (c) until a stop criterion is met, with the revised segmented corpus being used as the interim corpus and the revised log-linear model being used as the interim model.

17. The one or more computer-readable storage media of claim 16 having further computer-executable instructions, comprising, imposing one exponential prior to penalize segmentation of words into longer segments, and another exponential prior to penalize over-segmentation.

18. The one or more computer-readable storage media of claim 16 having further computer-executable instructions, comprising, sampling at least one negative example for contrastive estimation.

19. The one or more computer-readable storage media of claim 16 wherein processing the unlabeled examples of words comprises maintaining a lexicon set of morphemes, and a set of weights for morphemes and contexts that each describe characters adjacent a particular morpheme.

20. The one or more computer-readable storage media of claim 16 having further computer-executable instructions comprising, after step (d) using the revised log-linear model as a final log-linear model to determine the most probable segmentation of a new word.

* * * * *